United States Patent
Shimizu et al.

(10) Patent No.: US 9,952,105 B2
(45) Date of Patent: Apr. 24, 2018

(54) TEMPERATURE MEASUREMENT APPARATUS AND TEMPERATURE MEASUREMENT METHOD

(71) Applicant: SEIKO EPSON CORPORATION, Tokyo (JP)

(72) Inventors: Sakiko Shimizu, Matsumoto (JP); Akira Ikeda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 260 days.

(21) Appl. No.: 15/061,334

(22) Filed: Mar. 4, 2016

(65) Prior Publication Data
US 2016/0258823 A1 Sep. 8, 2016

(30) Foreign Application Priority Data
Mar. 6, 2015 (JP) ................................. 2015-045041

(51) Int. Cl.
*G01K 13/00* (2006.01)
*G01K 1/16* (2006.01)
*G01K 1/02* (2006.01)

(52) U.S. Cl.
CPC ............. *G01K 13/002* (2013.01); *G01K 1/02* (2013.01); *G01K 1/165* (2013.01)

(58) Field of Classification Search
CPC ....... G01K 13/002; G01K 7/427; G01K 1/165
See application file for complete search history.

(56) References Cited

U.S. PATENT DOCUMENTS

| | | | | |
|---|---|---|---|---|
| 6,220,750 B1* | 4/2001 | Palti | .................... | G01K 1/16 374/164 |
| 7,981,046 B2* | 7/2011 | Yarden | .................... | A61B 5/01 374/100 |
| 9,354,122 B2* | 5/2016 | Bieberich | .............. | G01K 1/165 |

(Continued)

FOREIGN PATENT DOCUMENTS

| | | |
|---|---|---|
| EP | 2888998 A2 | 7/2015 |
| JP | S55-29794 A | 3/1980 |

(Continued)

OTHER PUBLICATIONS

Jul. 14, 2016 Extended European Search Report issued in Patent Application No. 16158706.8.

*Primary Examiner* — Jaehwan Oh
(74) *Attorney, Agent, or Firm* — Oliff PLC

(57) ABSTRACT

A temperature measurement apparatus includes a first temperature sensor disposed so as to be close to a contact surface with an object to be measured in a thickness direction of an apparatus main body, and a second temperature sensor disposed so as to be close to a display unit in the thickness direction of the apparatus main body. The display unit is switched between a first display state and a second display state by switching a mark between display and non-display. An internal temperature of the object to be measured is calculated by using a detected temperature in the first temperature sensor and a detected temperature in the second temperature sensor in the first display state, and a detected temperature in the first temperature sensor and a detected temperature in the second temperature sensor in the second display state.

10 Claims, 5 Drawing Sheets

(56) References Cited

U.S. PATENT DOCUMENTS

| | | | | |
|---|---|---|---|---|
| 2005/0043631 A1* | 2/2005 | Fraden | ............... | A61B 5/01 600/474 |
| 2006/0056487 A1* | 3/2006 | Kuroda | ............... | G01K 1/165 374/179 |
| 2011/0224936 A1* | 9/2011 | Shimizu | ............... | G01K 7/427 702/99 |
| 2012/0109571 A1* | 5/2012 | Shimizu | ............... | G01K 1/165 702/130 |
| 2012/0109572 A1* | 5/2012 | Shimizu | ............... | G01K 1/165 702/131 |
| 2014/0278201 A1* | 9/2014 | Shimizu | ............... | G01K 13/002 702/131 |
| 2016/0069752 A1* | 3/2016 | Shimizu | ............... | G01K 7/427 600/549 |

FOREIGN PATENT DOCUMENTS

| | | | |
|---|---|---|---|
| JP | 2006-308538 A | 11/2006 |
| JP | 2013-061232 A | 4/2013 |
| JP | 2014-174084 A | 9/2014 |
| JP | 2016-057199 A | 4/2016 |

* cited by examiner

OBJECT TO BE MEASURED

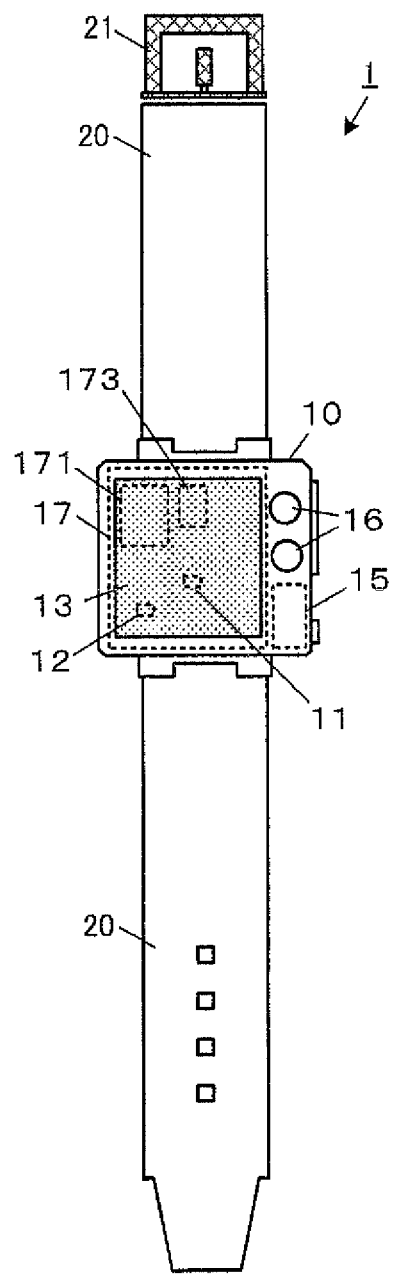
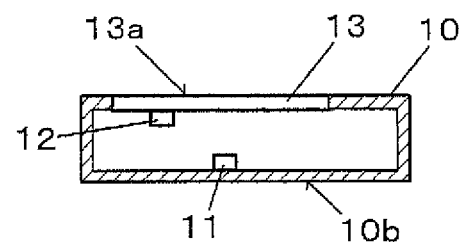
FIG. 2B
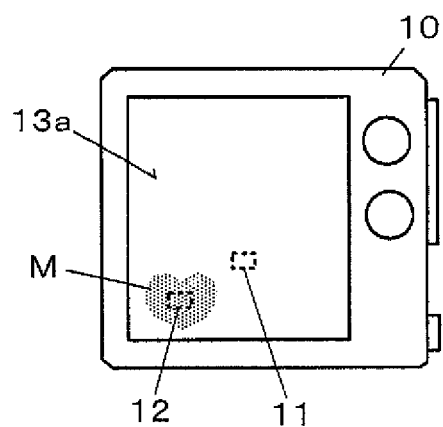
FIG. 2A
FIG. 2C

| TIME POINT | DISPLAY STATE | DETECTED TEMPERATURE | | CALCULATED TEMPERATURE | OUTPUT TEMPERATURE | MEASUREMENT STATE | DETERMINATION RESULT |
|---|---|---|---|---|---|---|---|
| | | FIRST | SECOND | | | | |
| T1 | FIRST | TDa1 | TDb1 | — | — | — | — |
| T2 | SECOND | TDa2 | TDb2 | TS2 | TO2 | NON-STEADY | NORMAL |
| T3 | FIRST | TDa3 | TDb3 | TS3 | TO3 | NON-STEADY | NORMAL |
| T4 | SECOND | TDa4 | TDb4 | TS4 | TO4 | STEADY | NORMAL |
| T5 | FIRST | TDa5 | TDb5 | TS5 | TO5 | STEADY | ABNORMAL |
| ... | ... | ... | ... | ... | ... | ... | ... |

FIG. 4

TEMPERATURE MEASUREMENT APPARATUS AND TEMPERATURE MEASUREMENT METHOD

This application claims the benefit of Japanese Patent Application No. 2015-045041, filed on Mar. 6, 2015. The content of the aforementioned application is incorporated herein by reference in its entirety.

BACKGROUND

1. Technical Field

The present invention relates to a temperature measurement apparatus and the like measuring an internal temperature of an object to be measured.

2. Related Art

Biological information such as a health condition, a basal metabolism condition, or a mental condition is obtained on the basis of a body temperature which is fundamentally vital information. In order to determine a health condition, a basal metabolism condition, or a mental condition of a person or an animal on the basis of a body temperature of the person or the animal, information regarding not a temperature of a surface layer of the person or the animal but rather an internal temperature (deep part temperature) thereof is necessary.

For example, in a case where an internal temperature of a furnace or a pipe is measured, if a temperature measurement apparatus can be provided outside the furnace or the pipe so as to measure an internal temperature, a facility or members for providing the temperature measurement apparatus inside the furnace or the pipe are not necessary, a cheaper temperature measurement apparatus can be used from the viewpoint of heat resistance, corrosion resistance, and a measurement range, and construction cost can be reduced.

As techniques regarding measurement of an internal temperature, for example, a technique disclosed in JP-A-55-29794 or JP-A-2006-308538 for measuring a temperature of the human body is known.

The technique disclosed in JP-A-55-29794 is a technique regarding internal temperature measurement using a so-called heat flow compensation method. In this technique, a heat flow compensation type probe is attached to a body surface, and an internal temperature of an object to be measured is measured by making heat radiation from the body surface zero on appearance. In this case, it is necessary to control a heater in order to bring the living body inside and the probe into a temperature equilibrium state. For this reason, not only is power for operating the heater necessary, but fine temperature control of the heater is also necessary in order to improve the accuracy of internal temperature measurement.

In the technique disclosed in JP-A-2006-308538, there is a problem in that heat balance occurring between the temperature measurement apparatus and the surrounding environment (external world) is not taken into consideration when an internal temperature is calculated. In other words, the technique disclosed in JP-A-2006-308538 is a technique based on a system in which heat balance does not occur between the temperature measurement apparatus and the surrounding environment, that is, an ideal system being capable of being formed. However, heat balance occurs between the temperature measurement apparatus and the surrounding environment in the real world, and thus there is a problem in that a temperature measurement error caused by the heat balance cannot be negligible.

SUMMARY

An advantage of some aspects of the invention is to propose a new method for measuring an internal temperature of an object to be measured.

A first aspect of the invention is directed to a temperature measurement apparatus including a display unit; a first temperature sensor that is disposed so as to be close to a contact surface with an object to be measured in a thickness direction of an apparatus main body; a second temperature sensor that is disposed so as to be close to the display unit in the thickness direction of the apparatus main body; and a calculation processing unit that calculates an internal temperature of the object to be measured by using a first state first temperature detected by the first temperature sensor and a first state second temperature detected by the second temperature sensor when the display unit is in a first display state, and a second state first temperature detected by the first temperature sensor and a second state second temperature detected by the second temperature sensor when the display unit is in a second display state.

As another aspect of the invention, the invention can be configured as a temperature measurement method for a temperature measurement apparatus including a display unit, a first temperature sensor that is disposed so as to be close to a contact surface with an object to be measured in a thickness direction of an apparatus main body, and a second temperature sensor that is disposed so as to be close to the display unit in the thickness direction of the apparatus main body, the method including switching the display unit between a first display state and a second display state; and calculating an internal temperature of the object to be measured by using a first state first temperature detected by the first temperature sensor and a first state second temperature detected by the second temperature sensor when the display unit is in the first display state, and a second state first temperature detected by the first temperature sensor and a second state second temperature detected by the second temperature sensor when the display unit is in the second display state.

According to the first aspect and the like of the invention, the first temperature sensor is disposed so as to be close to the contact surface with the object to be measured, and the second temperature sensor is disposed so as to be close to the display unit, in the thickness direction of the apparatus main body. An internal temperature of the object to be measured is calculated by using the first state first temperature detected by the first temperature sensor and the first state second temperature detected by the second temperature sensor when the display unit is in the first display state, and the second state first temperature detected by the first temperature sensor and the second state second temperature detected by the second temperature sensor when the display unit is in the second display state. The emissivity is changed by making a display state differ. Consequently, the heat balance characteristics obtained via the apparatus main body are changed, and thus a temperature of the position of at least the second temperature sensor is changed. As will be described later in detail, it is possible to obtain an accurate internal temperature of the object to be measured without determining heat balance characteristics by using the temperatures obtained in each display state.

A second aspect of the invention is directed to the temperature measurement apparatus according to the first aspect, in which the second temperature sensor is disposed under a portion of the display unit whose display color is changed in the first display state and the second display state.

According to the second aspect of the invention, the second temperature sensor can be disposed under a portion of the display unit whose display color is changed in the first display state and the second display state. Consequently, the second temperature sensor can be disposed at a position which is greatly influenced by a change of the emissivity as a result of the display state of the display unit being changed.

A third aspect of the invention is directed to the temperature measurement apparatus according to the second aspect, in which, in the display unit and the second temperature sensor, an area of the portion of the display unit is larger than an area of the second temperature sensor in a plan view.

In this case, as a fourth aspect of the invention, in the display unit and the second temperature sensor, an area of the portion of the display unit may be three times larger or more than an area of the second temperature sensor in a plan view.

According to the third and fourth aspects of the invention, the second temperature sensor can be more greatly influenced by a change of the emissivity as a result of the display state of the display unit being changed.

A fifth aspect of the invention is directed to the temperature measurement apparatus according to any one of the first to fourth aspects, in which the first temperature sensor and the second temperature sensor are disposed at positions to which distances from an outer edge or the center of the apparatus main body are different from each other in a plan view.

According to the fifth aspect of the invention, the heat balance characteristics can be made to be different from each other at the respective installation positions of the first temperature sensor and the second temperature sensor.

Regarding a specific method of calculating an internal temperature, as a sixth aspect of the invention, the calculation processing unit may calculate an internal temperature of the object to be measured on the basis of the following equation.

$$T_c = (T_{a1} \cdot T_{b2} - T_{b1} \cdot T_{a2})/(T_{a1} - T_{a2} - T_{b1} + T_{b2})$$

Here, $T_c$ indicates an internal temperature, $T_{a1}$ indicates the first state first temperature, $T_{a2}$ indicates the second state first temperature, $T_{b1}$ indicates the first state second temperature, and the $T_{b2}$ indicates the second state second temperature.

A seventh aspect of the invention is directed to the temperature measurement apparatus according to any one of the first to sixth aspects, in which the object to be measured is a human body, and the temperature measurement apparatus is configured as a wearable apparatus.

According to the seventh aspect of the invention, the temperature measurement apparatus can be configured as a wearable apparatus, and thus a body temperature of a user can be measured anywhere and anytime.

In relation to the display unit, some configurations may be employed. For example, as an eighth aspect of the invention, the display unit may include a liquid crystal display, and, as a ninth aspect of the invention, the display unit may include an electrophoretic device.

BRIEF DESCRIPTION OF THE DRAWINGS

The invention will be described with reference to the accompanying drawings, wherein like numbers reference like elements.

FIGS. 2A to 2C are diagrams illustrating a configuration of a temperature measurement apparatus.

FIG. 4 is a diagram illustrating an example of a structure of temperature data.

DESCRIPTION OF EXEMPLARY EMBODIMENTS

1. Principle

In the present embodiment, a description will be made assuming that an object to be measured is a human body, and an internal temperature of the human body is measured. Measurement of a temperature includes two types. In other words, one is "calculation" of a temperature, and the other is "estimation" of a temperature. The "calculation" will be first described, and then the "estimation" will be described.

1-1. Principle of Temperature Calculation

Figure 1A:
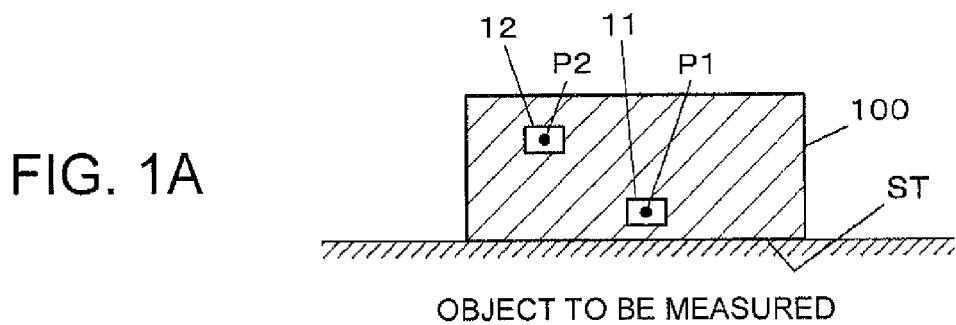
FIGS. 1A to 1C are diagrams for explaining a principle of temperature calculation.
Figure 1B:
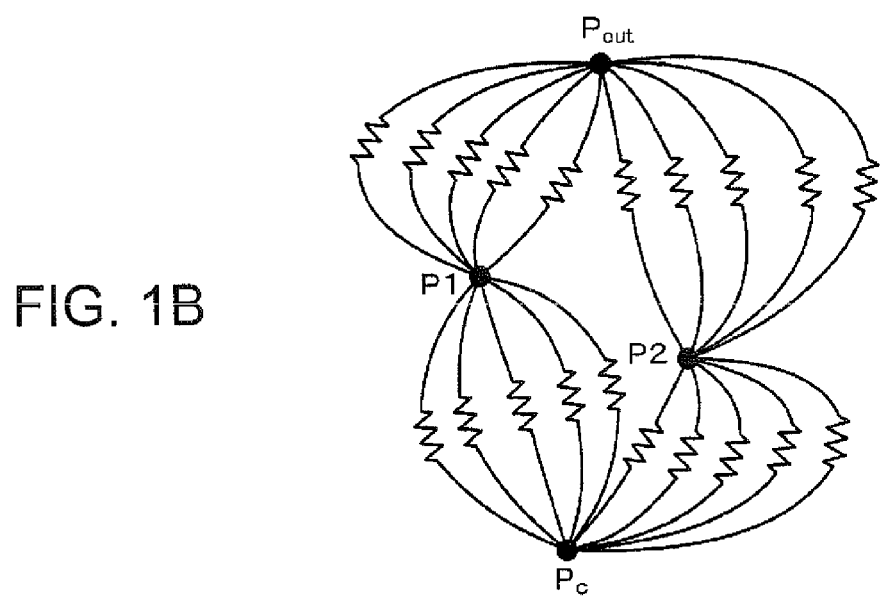
Figure 1C:
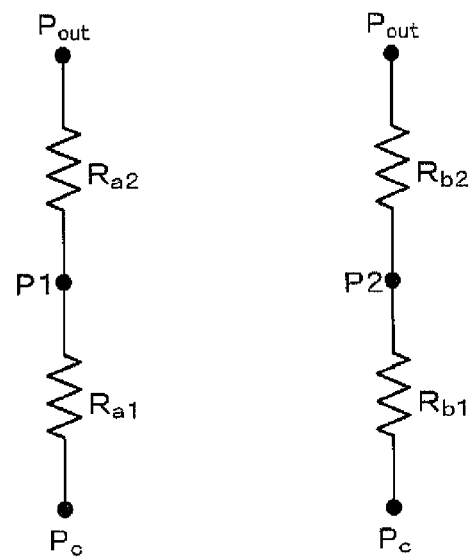

FIGS. 1A to 1C are diagrams for explaining a principle of the temperature calculation in the present embodiment. In the present embodiment, as illustrated in FIG. 1A, a base 100 is brought into contact with an object to be measured so that a contact surface ST is brought into contact with the object to be measured which is a temperature measurement target.

The base 100 has thermal conductivity, and is configured to include a plurality of temperature sensors at different positions inside the base 100. The base 100 is made of a material having a predetermined thermal conductivity (or thermal resistance).

In the present embodiment, temperature sensors are provided at two different positions in the base 100. Hereinafter, the two temperature sensors will be referred to as a first temperature sensor 11 and a second temperature sensor 12. As illustrated, positions where the first temperature sensor 11 and the second temperature sensor 12 detect a temperature will be respectively referred to as a first detection position P1 and a second detection position P2.

As the temperature sensor, a well-known sensor may be employed. For example, a sensor using a chip thermistor, a flexible board in which a thermistor pattern is printed, or a platinum temperature measuring resistor, or a sensor using a thermocouple element, a PN junction element, or a diode may be employed. An electric signal (hereinafter, referred to as a "temperature detection signal") corresponding to a temperature of the detection position is output from the temperature sensor, and a temperature detected by each temperature sensor is acquired on the basis of the temperature detection signal. Therefore, the temperature detection signal can be said to be equivalent to a detected temperature.

A position as a temperature measurement target of the object to be measured is referred to as a "measurement target position". Any position in the external world is referred to as "any external position". In the present embodiment, the object to be measured is the human body, but may be organic objects (living bodies) such as animals other than the human body, or may be inorganic objects such as a furnace, a pipe, and an engine. The external world indicates a measurement environment in which the object to be measured is placed.

It is assumed that an internal temperature of the human body is higher than an external temperature. Heat moves from a high temperature side to a low temperature side. For this reason, herein, for example, there may be a heat flow passage with a measurement target position $P_C$ as a heat source and any external position $P_{out}$ as a finish point. More specifically, there may be two heat flow passages including a heat flow passage (hereinafter, referred to as a "first heat flow passage") which reaches any external position $P_{out}$ from the measurement target position $P_C$ via the first detection position P1, and a heat flow passage (hereinafter, referred to as a "second heat flow passage") which reaches any external position $P_{out}$ from the measurement target position $P_C$ via the second detection position P2.

When heat flows along the first and the second heat flow passages, a procedure thereof is influenced by the inflow of heat from the external world and the outflow to the external world. In the present embodiment, the heat exchange is referred to as "heat balance". If the above-described heat flow passages are modeled in terms of electrical circuits by taking into consideration such heat balance, a heat flow passage model as illustrated in FIG. 1B can be built.

In the heat flow passage model illustrated in FIG. 1B, various passages may be considered as passages from the measurement target position $P_C$ to the first detection position P1, and various passages may also be considered as passages from the first detection position P1 to any external position $P_{out}$. In the heat flow passage model illustrated in FIG. 1B, each passage is represented as a resistor. This is also the same for the second heat flow passage. Of course, a value of each thermal resistor is not known.

If the heat flow passage model illustrated in FIG. 1B is simplified, models are obtained as illustrated in FIG. 1C. A thermal resistor obtained by combining the thermal resistors connected in parallel between the measurement target position $P_C$ and the first detection position P1 is indicated by $R_{a1}$, and a thermal resistor obtained by combining the thermal resistors connected in parallel between the first detection position P1 and any external position $P_{out}$ is indicated by $R_{a2}$. A thermal resistor obtained by combining the thermal resistors connected in parallel between the measurement target position $P_C$ and the second detection position P2 is indicated by $R_{b1}$, and a thermal resistor obtained by combining the thermal resistors connected in parallel between the second detection position P2 and any external position $P_{out}$ is indicated by $R_{b2}$.

A temperature of the measurement target position $P_C$ is referred to as an "internal temperature" and is indicated by $T_c$. A temperature of any external position $P_{out}$ is referred to as an "external temperature" and is indicated by $T_{out}$. Detected temperatures in the first temperature sensor 11 and the second temperature sensor 12 are respectively referred to as a "first detected temperature" and a "second detected temperature", and are indicated by $T_a$ and $T_b$.

In the heat flow passage model illustrated in FIG. 1C, the first detected temperature $T_a$ may be represented as in the following Equation (1) by using the thermal resistors $R_{a1}$ and $R_{a2}$, the internal temperature $T_c$, and the external temperature $T_{out}$. The second detected temperature $T_b$ may be represented as in the following Equation (2) by using the thermal resistors $R_{b1}$ and $R_{b2}$, the internal temperature $T_c$, and the external temperature $T_{out}$.

$$T_a = \frac{R_{a2}}{R_{a1}+R_{a2}}T_c + \frac{R_{a1}}{R_{a1}+R_{a2}}T_{out} \tag{1}$$

$$T_b = \frac{R_{b2}}{R_{b1}+R_{b2}}T_c + \frac{R_{b1}}{R_{b1}+R_{b2}}T_{out} \tag{2}$$

In order to obtain the internal temperature $T_c$, the terms of the external temperature $T_{out}$ are removed from Equations (1) and (2). As shown in the following Equation (3), the coefficient of the external temperature $T_{out}$ in Equation (1) and the coefficient of the external temperature $T_{out}$ in Equation (2) are respectively replaced as in the following Equations (3) and (4).

$$\frac{R_{a1}}{R_{a1}+R_{a2}} = a \tag{3}$$

$$\frac{R_{b1}}{R_{b1}+R_{b2}} = b \tag{4}$$

The coefficient a is represented by a proportion of the thermal resistor $R_{a1}$ to all the thermal resistors of the first heat flow passage. This indicates an influence of the heat balance which a heat flow traveling along the first heat flow passage receives from the thermal resistor $R_{a1}$, and may be considered as a coefficient indicating heat balance characteristics at the first detection position P1. This is also the same for the coefficient b.

In this case, Equations (1) and (2) may be respectively rewritten as the following Equations (5) and (6).

$$T_a = (1-a)T_c + aT_{out} \tag{5}$$

$$T_b = (1-b)T_c + bT_{end} \tag{6}$$

Therefore, the internal temperature $T_c$ may be expressed as in Equation (7) from Equations (5) and (6).

$$T_c = \frac{b}{b-a}T_a - \frac{a}{b-a}T_b \tag{7}$$
$$= \frac{1}{1-\frac{a}{b}}T_a - \frac{\frac{a}{b}}{1-\frac{a}{b}}T_b$$

Here, as a ratio between the coefficient a defined by Equation (3) and the coefficient b defined by Equation (4), a heat balance relative coefficient D expressed by the following Equation (8) is introduced.

$$D = \frac{a}{b} \tag{8}$$

The heat balance relative coefficient D is a coefficient (a relative value of the coefficient a and the coefficient b) indicating a relative relationship between the respective heat balance characteristics at the first detection position P1 and the second detection position P2. In this case, Equation (7) may be rewritten into Equation (9) by using the heat balance relative coefficient D.

$$T_c = \frac{1}{1-D}T_a - \frac{D}{1-D}T_b \tag{9}$$

If Equation (9) is solved for the heat balance relative coefficient D, the following Equation (10) is obtained.

$$D = \frac{T_a - T_c}{T_b - T_c} \quad (10)$$

As can be seen from Equation (10), the heat balance relative coefficient D is calculated by using a difference between a temperature detected by the first temperature sensor 11 and the internal temperature $T_c$ of the object to be measured and a difference between the temperature detected by the second temperature sensor 12 and the internal temperature $T_c$ of the object to be measured. The internal temperature $T_c$ of the object to be measured is a measurement target temperature, and a value thereof is unknown.

However, it is assumed that the heat balance characteristics in the heat flow passages can be changed in a state in which there is no change in the internal temperature $T_c$ and the external temperature $T_{out}$. Then, the following Equation (11) is established. Here, a state before the heat balance characteristics are changed is referred to as a "first state"; a state after the heat balance characteristics are changed is referred to as a "second state"; a detected temperature in the first temperature sensor 11 before the heat balance characteristics are changed is referred to as a first state first temperature $T_{a1}$; a detected temperature in the second temperature sensor 12 before the heat balance characteristics are changed is referred to as a first state second temperature $T_{b1}$; a detected temperature in the first temperature sensor 11 after the heat balance characteristics are changed is referred to as a second state first temperature $T_{a2}$; and a detected temperature in the second temperature sensor 12 after the heat balance characteristics are changed is referred to as a second state second temperature $T_{b2}$.

$$D = \frac{T_{a1} - T_c}{T_{b1} - T_c} = \frac{T_{a2} - T_c}{T_{b2} - T_c} \quad (11)$$

If the heat balance relative coefficient D is removed from Equation (11), the following Equation (12) is obtained. In other words, the heat balance relative coefficient D is still unknown, and the internal temperature $T_c$ can be directly obtained without using the heat balance relative coefficient D. Therefore, it is possible to calculate the internal temperature $T_c$ with high accuracy.

$$T_c = \frac{T_{a1} \cdot T_{b2} - T_{b1} \cdot T_{a2}}{T_{a1} - T_{a2} - T_{b1} + T_{b2}} \quad (12)$$

The above description relates to the "calculation" of a temperature.

1-2. Principle of Temperature Estimation

An internal temperature of an object to be measured can be calculated according to the above-described principle of temperature calculation, but some time is required after the base 100 is brought into contact with the object to be measured until a temperature (that is, a temperature of the installation position of the temperature sensor) inside the base 100 is stabilized and reaches a steady state. Since the first detected temperature $T_a$ in the first temperature sensor and the second detected temperature $T_b$ in the second temperature sensor 12 change during a transient state before the steady state, even if the internal temperature $T_c$ is obtained according to Equation (12) by using the first detected temperature $T_a$ and the second detected temperature $T_b$ obtained previously, there is a concern that an error may be included in the calculated temperature.

Therefore, a technique for estimating a temperature in the steady state from a temperature in the transient state is introduced. Specifically, in the present embodiment, an expression of non-steady thermal conduction is used which is obtained from a thermal conduction equation. If, as temperatures calculated with time differences, the internal temperature $T_c$ calculated at a time point $t_1$ is referred to as a first internal temperature $T_{c1}$, and the internal temperature $T_c$ calculated at a time point $t_2$ is referred to as a second internal temperature $T_{c2}$, a steady internal temperature $T_{cX}$ can be estimated by using the following Equation (13). This operation is the "estimation" of a temperature.

$$T_{cX} = \frac{T_{c2} - T_{c1} \times \exp\left(-\frac{t_2 - t_1}{R \cdot C}\right)}{1 - \exp\left(-\frac{t_2 - t_1}{R \cdot C}\right)} \quad (13)$$

Here, R is a thermal resistance constant and is predefined, and C is a thermal capacity constant and is predefined. Instead of each of the thermal resistance constant R and the thermal capacity constant C being predefined, a value of R×C may be predefined.

In the "estimation" process, a temperature can be effectively obtained not only in the transient state (non-steady state) but also in the steady state. For this reason, in the present embodiment, a temperature obtained during the "estimation" process is assumed to be output as an internal temperature (output value) of an object to be measured at all times. However, in a case where a predetermined stabilization condition in which a change in a "calculated" temperature is not considerable is satisfied, the "estimation" process may be omitted, and the "calculated" temperature may be used as an output value.

2. Examples

Next, a description will be made of Examples of a temperature measurement apparatus 1 which measures an internal temperature of an human body which is an object to be measured according to the above-described principle.

2-1. Exterior Configuration

FIG. 2A is an exterior view illustrating the entire configuration example of the temperature measurement apparatus 1. In the present example, the temperature measurement apparatus 1 is configured as a wristwatch type wearable apparatus mounted on the arm of a user who is an object to be measured and is a human body by fastening two bands 20 and 20 provided on an apparatus main body 10 with a buckle 21. The two bands 20 and 20 are wound on the arm of the user, and thus a rear surface (contact surface) of the apparatus main body 10 can be brought into close contact with a skin surface of the user. A mounting part is not limited to the arm, and the temperature measurement apparatus 1 may be mounted on a skin surface of another part such as the chest, the abdomen, the neck, the thigh, or the ankle. The temperature measurement apparatus 1 may reach the upper arm from the wrist. The bands 20 may be lengthened, a part of the bands 20 may be made of an elastic material, or a hook-and-loop fastener may be used instead of the buckle 21, according to mounting parts. Of course, also in the present embodiment, the hook-and-loop fastener may be used instead of the buckle 21.

The temperature measurement apparatus 1 includes a display unit 13 which has a display surface on a surface side (a side directed outward when a user wears the temperature measurement apparatus 1) of the apparatus main body 10, and an operation switch 16 as an operation input unit. The user can perform various input operations such as a measurement starting operation by operating the operation switch 16. A charging type battery 15 and a control board 17 are built into the apparatus main body 10. Although not illustrated, a communication device for transmitting a result of measuring an internal temperature to an external apparatus, a reader/writer device for reading and writing a measurement result from and to a memory card, and the like are provided at proper locations of the apparatus main body 10 as appropriate.

A method of charging the battery 15 may be set as appropriate. For example, there may be a configuration in which an electrical contact is separately provided on a rear surface side of the apparatus main body 10 and is set in a cradle connected to a household power supply, and the battery 15 is charged via the electrical contact and the cradle, and there may be a configuration in which the battery 15 may be charged in a non-contact wireless manner.

The control board 17 is mounted with a central processing unit (CPU) 171, and a storage medium 173 which is a storage element such as an integrated circuit (IC) memory. In addition, the control board 17 may be mounted with necessary electronic components such as an application specific integrated circuit (ASIC), a field-programmable gate array (FPGA), and various integrated circuits as appropriate. The temperature measurement apparatus 1 realizes various functions such as an internal temperature measurement function by the CPU 171 executing a program stored in the storage medium 173.

The display unit 13 is constituted of a small-sized display such as a liquid crystal display, an electrophoretic device, or an organic electroluminescent (EL) display. The display unit 13 may have a touch panel function.

FIG. 2B is a schematic diagram for explaining positions where the first temperature sensor 11 and the second temperature sensor 12 are disposed in a sectional view in a thickness direction of the apparatus main body 10. In the thickness direction of the apparatus main body 10, the first temperature sensor 11 is disposed so as to be close to a contact surface 10*b* which is the rear surface of the apparatus main body 10 which is in contact with the user's skin, and the second temperature sensor 12 is disposed so as to be close to the display unit 13. More specifically, the first temperature sensor 11 is disposed at a position closer to the contact surface 10*b* than the display unit 13, and the second temperature sensor 12 is disposed at a position closer to the display unit 13 than the contact surface 10*b*.

FIG. 2C is a diagram for explaining a positional relationship between a display surface 13*a* of the display unit 13, and the first temperature sensor 11 and the second temperature sensor 12 in a plan view of the apparatus main body 10. The display unit 13 has a designated portion at which a mark M indicating that a display state is changed in order to measure an internal temperature is displayed. The second temperature sensor 12 is positioned under the display portion of the mark M, and the first temperature sensor 11 is disposed far from the mark M.

In a situation in which an internal temperature of the human body is higher than an external temperature, a heat flow passage is formed in which heat dissipates from the human body via the apparatus main body 10. At this time, since heat dissipates via the surface of the apparatus main body 10, if the emissivity of the surface of the apparatus main body 10 is changed, dissipating heat is also changed. That is, in the present example, the emissivity is changed by changing a display state of the display unit 13, so as to change the heat balance characteristics. In the present example, the mark M indicates a change of a display state.

Particularly, the present example is characterized in that the second temperature sensor 12 is positioned between the skin surface of the user and the mark M directly under the mark M. For this reason, a heat flow passage including the arrangement position of the second temperature sensor 12 is greatly influenced by a change of the emissivity when the mark M is displayed or not displayed, and thus the heat balance characteristics are influenced. As a result, it is possible to cause the "first state" and the "second state" described in the principle to relatively easily occur through display or non-display of the mark M.

In the present example, as illustrated in FIG. 2C, an area of the mark M in a plan view is three times or more than an area of the second temperature sensor 12 so that the influence of the change of the emissivity is further exhibited. The second temperature sensor 12 is provided directly under the mark M at substantially the center thereof.

As illustrated in FIG. 2C, the first temperature sensor 11 and the second temperature sensor 12 are disposed at the positions to which distances from the outer edge and the center of the apparatus main body 10 are different from each other in a plan view. Consequently, resistances related to the outflow of heat at the respective positions of the first temperature sensor 11 and the second temperature sensor 12 can be made different from each other, and thus detected temperatures in the first temperature sensor 11 and the second temperature sensor 12 can be made different from each other in the steady state.

In the present example, the first temperature sensor 11 and the second temperature sensor 12 are disposed at positions to which distances from the outer edge and the center of the apparatus main body 10 are different from each other, but either distances from the outer edge of the apparatus main body 10 or distances from the center of the apparatus main body 10 may be different from each other in a plan view.

In the present example, a change of a display state is indicated by display or non-display of the mark M, but other display forms may be employed, such as switching between black display and white display in the entire surface or ¼ of the lower left screen of the display surface 13*a*.

2-2. Functional Configuration

Figure 3:
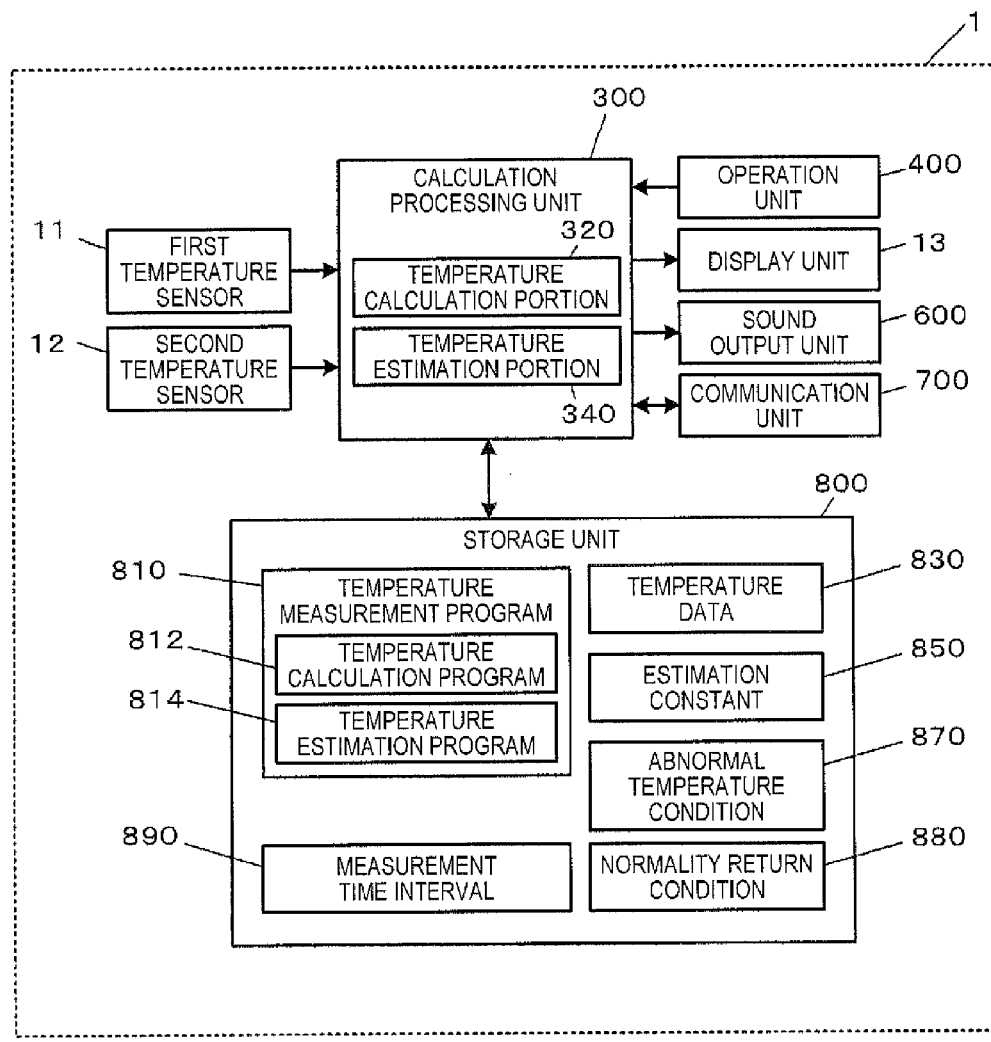
FIG. 3 is a block diagram illustrating a function of the temperature measurement apparatus.

FIG. 3 is a block diagram illustrating an example of a schematic configuration of the temperature measurement apparatus 1 according to the present embodiment. The temperature measurement apparatus 1 includes the first temperature sensor 11, the second temperature sensor 12, a calculation processing unit 300, an operation unit 400, the display unit 13, a sound output unit 600, a communication unit 700, and a storage unit 800.

The calculation processing unit 300 is a control device and a calculation device which collectively control each unit of the temperature measurement apparatus 1 according to various programs such as a system program stored in the storage unit 800, and is constituted of, for example, a processor such as a central processing unit (CPU) or a digital signal processor (DSP).

The calculation processing unit 300 includes a temperature calculation portion 320 and a temperature estimation portion 340 which measure a temperature of the object to be measured as main functional portions, and performs a temperature measurement process which will be described with reference to FIG. 5, according to a temperature measurement program 810. The calculation processing unit 300 also has a clocking function of counting time points and the like.

The temperature calculation portion 320 changes a display state of the display unit 13, and calculates a temperature according to the above Equation (12) by using detected temperatures indicated by the temperature detection signals from the first temperature sensor 11 and the second temperature sensor 12 before and after the display state is changed.

The temperature estimation portion 340 estimates a temperature according to Equation (13) by using calculated temperatures which are calculated at different timings, specifically, the previous measurement timing and the present measurement timing by the temperature calculation portion 320. The thermal resistance constant R and the thermal capacity constant C, or a value of R×C (hereinafter, collectively referred to as "estimation constants") are initially set and are set as an estimation constant 850 in the storage unit 800.

In the present example, the temperature estimation portion 340 is assumed to operate at all times in order to measure a temperature. For this reason, a temperature estimated by the temperature estimation portion 340 is stored in temperature data 830 (refer to FIG. 4) of the storage unit 800 as an output temperature which is a measurement result.

The operation unit 400 is an input device including a switch and the like, and outputs a signal corresponding to the pressed switch to the calculation processing unit 300. The operation unit 400 is used to input a set value for initial setting, or to input various instruction operations such as starting and finishing of temperature measurement.

The display unit 13 is a display device which is constituted of a small-sized display such as a liquid crystal display, an electrophoretic device, or an organic electroluminescent (EL) display, and performs various display based on display signals which are input from the calculation processing unit 300. The display unit 13 displays the mark M for measuring an internal temperature, an output temperature which is a measurement result, identification of whether a measurement state is a non-steady state or a steady state, identification of whether or not a measured temperature is abnormal or normal, and the like.

The sound output unit 600 includes a speaker and reproduces and outputs sound on the basis of a sound signal which is input from the calculation processing unit 300. The sound output unit 600 outputs identification sound of whether a measured temperature is abnormal or normal, various notification sounds, and the like. The sound mentioned here also includes voice.

The communication unit 700 is a communication device which transmits and receives information used in the apparatus to and from an external information processing apparatus such as a personal computer (PC) under the control of the calculation processing unit 300. As a communication method of the communication unit 700, various methods may be employed, such as a method of performing wired connection via a cable conforming to a predetermined standard, and a method of performing wireless connection using near field wireless communication.

The storage unit 800 includes a storage device such as a read only memory (ROM), a flash ROM, and a random access memory (RAM). The storage unit 800 stores a system program of the temperature measurement apparatus 1, various programs for realizing various functions such as a temperature calculation function, a temperature estimation function, and a communication function, data, and the like.

Figure 5:
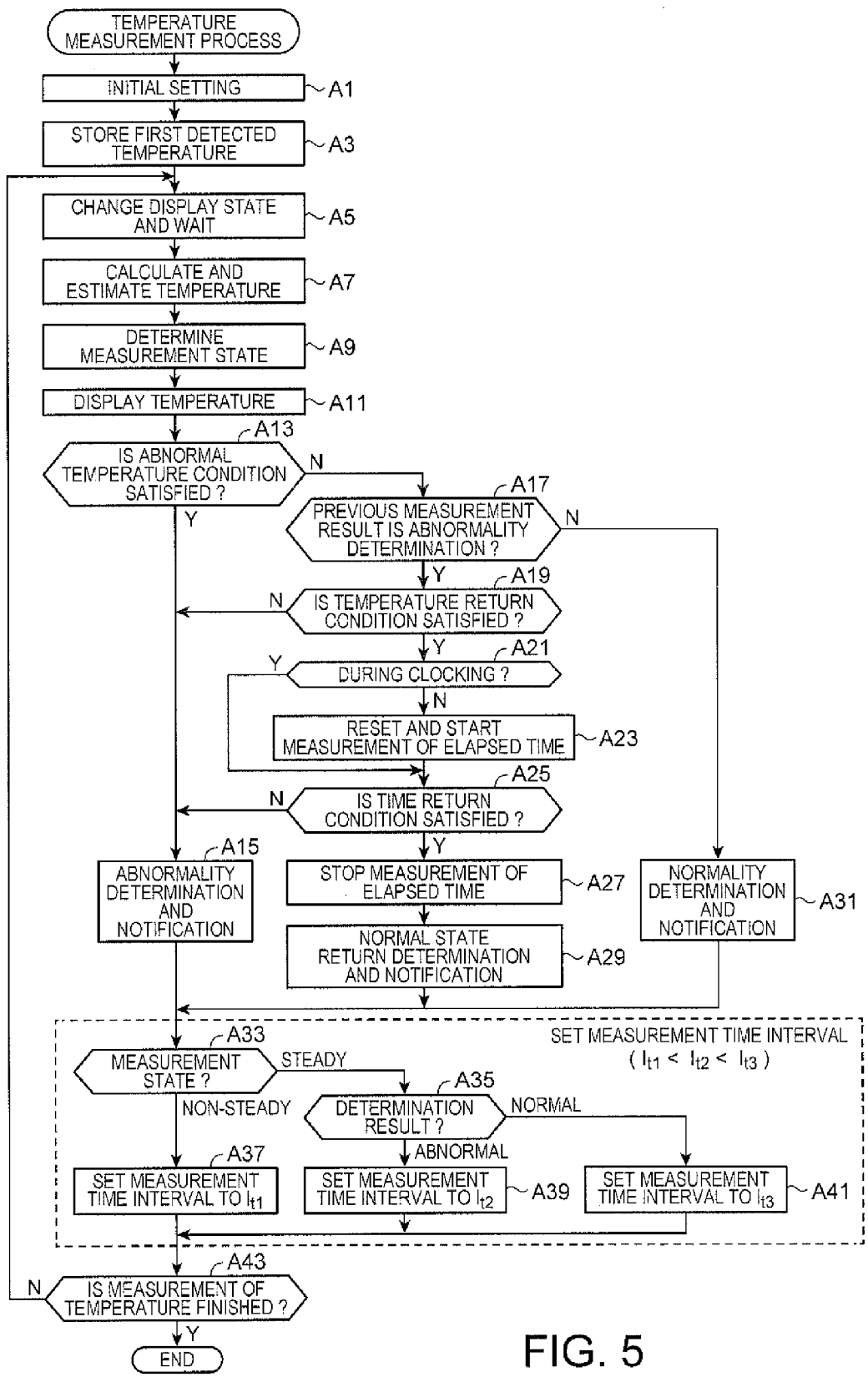
FIG. 5 is a flowchart illustrating a flow of a temperature measurement process.

The storage unit 800 stores, as a program, the temperature measurement program 810 which is read by the calculation processing unit 300 and is executed as the temperature measurement process (refer to FIG. 5). The temperature measurement program 810 includes, as subroutines, a temperature calculation program 812 for calculating a temperature and a temperature estimation program 814 for estimating a temperature according to the above-described principle. The temperature measurement process will be described later in detail with reference to a flowchart.

The storage unit 800 stores, as data, the temperature data 830, the estimation constant 850, an abnormal temperature condition 870, a normality return condition 880, and a measurement time interval 890.

The temperature data 830 has, for example, a data structure illustrated in FIG. 4. In other words, the temperature data 830 stores identification information for identifying the first state in which the mark M of the display unit 13 is not displayed and the second state in which the mark M is displayed; detected temperatures based on temperature detection signals which are respectively input from the first temperature sensor 11 and the second temperature sensor 12; a calculated temperature which is calculated by using the detected temperatures; an output temperature (output value) which is estimated by using the calculated temperature and is output as a result of the measurement; a measurement state indicating whether a measurement state is a non-steady state or a steady state; and a determination result of whether the output temperature is normal or abnormal, in correlation with each measurement time point. Therefore, the temperature data 830 can be said to be history data of each value.

Here, the time point indicates a time point (timing) at which a temperature is measured. The measurement state is determined on the basis of the progress of a change in a calculated temperature. For example, a temperature change speed is obtained on the basis of a difference between the previous and present calculated temperatures, and a calculation time interval. If the temperature change speed enters a specific value range, a steady state is determined, and otherwise, a non-steady state is determined.

In FIG. 4, at a first time point "T1", only a detected temperature in the first detection in which a display state is constant is obtained, thus a temperature cannot be calculated, and all the columns of the calculated temperature, the output temperature, the measurement state, and the determination result are vacant.

Referring to FIG. 3 again, the abnormal temperature condition 870 is a condition for determining whether or not an output temperature is abnormal. For example, the condition is, an OR condition of a high temperature side condition (for example, 38 degrees or higher) and a low temperature side condition (for example, 27 degrees or lower). Abnormality is determined in a case of a high temperature or a low temperature.

The normality return condition 880 is a condition for determining whether or not an output temperature returns to a normal temperature after abnormality is determined since the abnormal temperature condition 870 is satisfied. The normality return condition 880 includes a condition regarding a temperature (return temperature condition) and a condition regarding time (return time condition). The return temperature condition is a condition with a threshold value closer to a normal value than a threshold value of the abnormal temperature condition 870. For example, the return temperature condition is that a temperature is included in a temperature range from 30 degrees or higher as the low temperature side condition to below 37.5 degrees as the high temperature side condition. The return time condition is a condition for determining whether or not a state satisfying the return temperature condition lasts for a predetermined period of time, and one minute or more is defined as the condition. Thus, the normality return condition 880 is that the duration of the state satisfying the return temperature condition satisfies the return time condition.

The measurement time interval 890 is a time interval at which temperature measurement is performed. The measurement time interval 890 is changed depending on whether a measurement state is a steady state or a non-steady state (transient state) or whether a determination result is normality determination (normal temperature) or abnormality determination (abnormal temperature). Specifically, the time interval is set to be shorter in the non-steady state than in the steady state. The time interval is set to be shorter in the abnormality determination than in the normality determination.

Setting of the measurement time interval 890 is not limited thereto. In a case where the normality determination or the steady state lasts, the time interval may be gradually lengthened up to a predetermined maximum time interval. In a case where a determination result changes from the normality determination to the abnormality determination, the time interval may be switched to a predetermined minimum time interval, and in a case where the abnormality determination lasts, the time interval may be gradually lengthened up to a predetermined abnormality time interval. When measurement is started, a measurement time interval may be set to the minimum time interval, and may be gradually lengthened up to a predetermined non-steady time standard time interval according to a period of time for which the non-steady state lasts during the non-steady state. If the time interval is lengthened, power can be saved.

2-3. Flow of Temperature Measurement Process

FIG. 5 is a flowchart illustrating a flow of the temperature measurement process which is performed by the calculation processing unit 300 according to the temperature measurement program 810 stored in the storage unit 800.

First, the calculation processing unit 300 performs initial setting (step A1). For example, as a condition of finishing temperature measurement, the number of times of measurement or a time period in which the temperature measurement process lasts may be set.

Next, the calculation processing unit 300 acquires detected temperatures in the first temperature sensor 11 and the second temperature sensor 12 and stores the detected temperatures in the temperature data 830 (step A3). The detected temperatures are the first detected temperatures, and an internal temperature is not calculated.

Next, the calculation processing unit 300 changes a display state of the display unit 13 (step A5). In a case where the mark M is not displayed in the previous display state, the mark M is displayed, and, in a case where the mark M is displayed in the previous display state, the mark M is not displayed. Consequently, switching between the first display state and the second display state is performed. Since the display state is changed, the calculation processing unit 300 waits without performing another process for a predetermined time period. The waiting time period is a time period which is sufficient for the emissivity of the apparatus main body 10 to change, and may be set to, for example, five seconds to five minutes as appropriate depending on a material or the like of the apparatus main body 10.

Next, the calculation processing unit 300 acquires detected temperatures in the first temperature sensor 11 and the second temperature sensor 12, stores the detected temperatures in the temperature data 830, and calculates an internal temperature by using the present detected temperatures and the detected temperatures at the previous measurement timing (step A7). The calculation processing unit 300 estimates an internal temperature by using a calculated temperature which is calculated at the previous measurement timing and a calculated temperature which is calculated at the present measurement timing (step A7). The estimated temperature is used as a measurement result at the present measurement timing, and is stored in the temperature data 830 as an output temperature. The calculated temperature obtained in the process of obtaining the output temperature is also stored in the temperature data 830 in correlation with a measurement time point.

Next, the calculation processing unit 300 determines a measurement state on the basis of the progress of the calculated temperature and stores the determined measurement state in the temperature data 830 (step A9). The output temperature is displayed on the display unit 13 (step A11). In this case, the determined measurement state may be displayed.

If the output temperature satisfies the abnormal temperature condition 870 (YES in step A13), the calculation processing unit 300 determines that the temperature is abnormal, and performs a notification of the abnormal temperature (step A15). If the output temperature does not satisfy the abnormal temperature condition 870 (NO in step A13), the calculation processing unit 300 determines whether or not the measurement result at the previous measurement timing is abnormality determination (step A17). If the measurement result at the previous measurement timing is abnormality determination (YES in step A17), it is determined whether or not the present output temperature satisfies the return temperature condition of the normality return condition 880 (step A19). Here, if a determination result is negative (NO in step A19), abnormality is determined (step A15). This case indicates that the present output temperature is not abnormal but is determined as being abnormal until it is continuously determined that the present output temperature is not abnormal since the previous determination is abnormality determination.

If it is determined that the return temperature condition is satisfied (YES in step A19), the duration of the state determined as satisfying the return temperature condition is measured (steps A21 to A23). In other words, if the duration is not measured, measurement of elapsed time is reset so as to be started again.

If the measured elapsed time satisfies the return time condition (YES in step A25), the measurement of the elapsed time is stopped (step A27), the output temperature is determined as returning to a normal temperature, and a notification thereof is performed (step A29). If the return time condition is not satisfied (NO in step A25), the calculation processing unit 300 continuously determines abnormality in a wait-and-see state in step A15.

If the previous determination result is not abnormality determination in step A17 (NO in step A17), normality is determined, and a notification thereof is performed (step A31).

After any one of steps A15, A29, and A31, the calculation processing unit 300 sets the measurement time interval 890. In other words, if a measurement state is the non-steady state (the non-steady state in step A33), a time interval $I_{t1}$ is set as the measurement time interval 890 (step A37). In a case where the measurement state is the steady state (the steady state in step A33), a time interval $I_{t2}$ is set as the measurement time interval 890 if a determination result is abnormality determination, and a time interval $I_{t3}$ is set as the measurement time interval 890 if the determination result is normality determination (steps A39 and A41), The time intervals satisfy $I_{t1}<I_{t2}<I_{t3}$.

The calculation processing unit 300 determines whether or not the temperature measurement process is finished, and if the temperature measurement process is not finished (NO in step A43), the calculation processing unit 300 causes the process to proceed to step A5 when the next measurement timing occurs on the basis of the set measurement time interval 890. If it is determined that the temperature measurement is finished (YES in step A43), the calculation processing unit 300 finishes the temperature measurement process.

2-4. Operations and Effects

As described above, according to the temperature measurement apparatus 1, in the thickness direction of the apparatus main body 10, the first temperature sensor 11 is disposed so as to be close to the contact surface 10b of the object to be measured, and the second temperature sensor 12 is disposed so as to be close to the display unit 13. An internal temperature of the object to be measured is calculated by using the first state first temperature detected by the first temperature sensor 11 and the first state second temperature detected by the second temperature sensor 12 when the display unit 13 is in the first display state, and the second state first temperature detected by the first temperature sensor 11 and the second state second temperature detected by the second temperature sensor 12 when the display unit 13 is in the second display state. The emissivity is changed by making a display state of the display unit 13 differ. Consequently, the heat balance characteristics obtained via the apparatus main body 10 are changed, and thus a temperature of the position of at least the second temperature sensor 12 is changed.

The internal temperature is calculated by using Equation (12). Consequently, since the heat balance characteristics are not required to be determined, it is possible to obtain an accurate internal temperature of the object to be measured.

The second temperature sensor 12 is positioned under the mark M whose display color is changed according to the first display state and the second display state. Thus, the second temperature sensor 12 can be greatly influenced by a change of the emissivity as a result of the display state of the display unit 13 being changed.

In the temperature measurement, a temperature in a steady state is "estimated" from a temperature which is temporarily "calculated" in consideration of a case of a non-steady state (transient state) in which a temperature of the apparatus main body 10 does not reach the steady state. Thus, it is possible to obtain a highly accurate internal temperature even in the non-steady state (transient state) in which the apparatus main body 10 has just come into contact with a skin surface.

3. Modification Examples

An example of the embodiment to which the invention is applied has been described, but an embodiment to which the invention is applicable is not limited to the above-described embodiment.

For example, the temperature measurement apparatus 1 has been described as a wearable apparatus which is mounted on and is fixed to a human body with the bands 20 and 20, but may be configured as smart glasses. In this case, the first temperature sensor 11 and the second temperature sensor 12 are built into a portion which is in contact with the skin, such as moderns (front cells) or temples of a glasses frame, and a display screen is provided on an outer surface on an opposite side to the contact surface with the skin. More specifically, in a thickness direction of the portion, the first temperature sensor 11 is provided so as to be close to the contact surface with the skin, and the second temperature sensor 12 is provided so as to be close to a display unit. Control of a display state or calculation of a temperature is the same as in the above-described embodiment.

In the above-described embodiment, two temperature sensors are used, but three or more temperature sensors may be used. For example, a plurality of temperature sensors are disposed around the position of the above-described first temperature sensor 11, and, among detected temperatures in the temperature sensors, a median or a mean value is used as a detected temperature of the position of the first temperature sensor 11. Similarly, a plurality of temperature sensors are disposed around the position of the above-described second temperature sensor 12, and, among detected temperatures in the temperature sensors, a median or a mean value is used as a detected temperature of the position of the second temperature sensor 12.

What is claimed is:

1. A temperature measurement apparatus comprising:
  a display unit;
  a first temperature sensor that is disposed so as to be close to a contact surface with an object to be measured in a thickness direction of an apparatus main body;
  a second temperature sensor that is disposed so as to be close to the display unit in the thickness direction of the apparatus main body; and
  a calculation processing unit that calculates an internal temperature of the object to be measured by using a first state first temperature detected by the first temperature sensor and a first state second temperature detected by the second temperature sensor when the display unit is in a first display state, and a second state first temperature detected by the first temperature sensor and a second state second temperature detected by the second temperature sensor when the display unit is in a second display state.

2. The temperature measurement apparatus according to claim 1,
  wherein the second temperature sensor is disposed under a portion of the display unit whose display color is changed in the first display state and the second display state.

3. The temperature measurement apparatus according to claim 2,
  wherein, in the display unit and the second temperature sensor, an area of the portion of the display unit is larger than an area of the second temperature sensor in a plan view.

4. The temperature measurement apparatus according to claim 3,
  wherein, in the display unit and the second temperature sensor, an area of the portion of the display unit is three times larger or more than an area of the second temperature sensor in a plan view.

5. The temperature measurement apparatus according to claim 1,
  wherein the first temperature sensor and the second temperature sensor are disposed at positions to which distances from an outer edge or the center of the apparatus main body are different from each other in a plan view.

6. The temperature measurement apparatus according to claim 1,
wherein the calculation processing unit calculates an internal temperature of the object to be measured on the basis of the following equation:

$$T_c = (T_{a1} \cdot T_{b2} - T_{b1} \cdot T_{a2})/(T_{a1} - T_{a2} - T_{b1} + T_{b2})$$

where, $T_c$ indicates an internal temperature, $T_{a1}$ indicates the first state first temperature, $T_{a2}$ indicates the second state first temperature, $T_{b1}$ indicates the first state second temperature, and the $T_{b2}$ indicates the second state second temperature.

7. The temperature measurement apparatus according to claim 1,
wherein the object to be measured is a human body, and
wherein the temperature measurement apparatus is configured as a wearable apparatus.

8. The temperature measurement apparatus according to claim 1,
wherein the display unit includes a liquid crystal display.

9. The temperature measurement apparatus according to claim 1,
wherein the display unit includes an electrophoretic device.

10. A temperature measurement method for a temperature measurement apparatus including a display unit, a first temperature sensor that is disposed so as to be close to a contact surface with an object to be measured in a thickness direction of an apparatus main body, and a second temperature sensor that is disposed so as to be close to the display unit in the thickness direction of the apparatus main body, the method comprising:
switching the display unit between a first display state and a second display state; and
calculating an internal temperature of the object to be measured by using a first state first temperature detected by the first temperature sensor and a first state second temperature detected by the second temperature sensor when the display unit is in the first display state, and a second state first temperature detected by the first temperature sensor and a second state second temperature detected by the second temperature sensor when the display unit is in the second display state.

* * * * *